United States Patent
Lindstrand

(10) Patent No.: US 9,827,997 B2
(45) Date of Patent: Nov. 28, 2017

(54) INFRASTRUCTURE SYSTEM FOR A VEHICLE

(71) Applicant: SCANIA CV AB, Södertälje (SE)

(72) Inventor: Hannes Lindstrand, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 15/107,378

(22) PCT Filed: Feb. 5, 2015

(86) PCT No.: PCT/SE2015/050128
§ 371 (c)(1),
(2) Date: Jun. 22, 2016

(87) PCT Pub. No.: WO2015/122825
PCT Pub. Date: Aug. 20, 2015

(65) Prior Publication Data
US 2016/0339925 A1 Nov. 24, 2016

(30) Foreign Application Priority Data
Feb. 17, 2014 (SE) ...................... 1450179

(51) Int. Cl.
*G05B 19/045* (2006.01)
*B60R 16/02* (2006.01)
(Continued)

(52) U.S. Cl.
CPC ............ *B60W 50/04* (2013.01); *B60W 50/00* (2013.01); *G05B 19/0421* (2013.01);
(Continued)

(58) Field of Classification Search
CPC ................. B60W 50/00; B60W 50/04; B60W 2050/0005; B60W 2050/0016;
(Continued)

(56) References Cited

U.S. PATENT DOCUMENTS 6,484,082 B1 * 11/2002 Millsap ............... H04L 12/4035
701/32.7
8,527,140 B2 * 9/2013 Schwartz ................ B60R 25/00
340/539.13
(Continued)

FOREIGN PATENT DOCUMENTS

EP 1158718 B1 1/2007
WO WO 2009/054769 A1 4/2009

OTHER PUBLICATIONS

International Search Report dated Jun. 1, 2015 issued in corresponding International patent application No. PCT/SE2015/050128.
(Continued)

*Primary Examiner* — Michael J Zanelli
(74) *Attorney, Agent, or Firm* — Ostrolenk Faber LLP

(57) ABSTRACT

An electrical infrastructure system and method of use of the system for a vehicle. There are several electronic control units (ECU) for one or several functional units (30n) for the vehicle. The ECUs are connected through a network (32). The infrastructure system is configured to implement a state map including various operational states Sn that the vehicle can adopt. These operational states are connected by one or several transitions Tn, where the transition from one operational state to another depends on predetermined transition conditions being satisfied. The infrastructure system is configured to receive one or several input signals (34) to at least one ECU, comprising parameter values that represent events. The at least one ECU is configured to analyze the input signals with the aid of the transition conditions, to determine an operational state, and to make the operational state that has been determined available on the network (32).

15 Claims, 2 Drawing Sheets

(51) Int. Cl.
*G06F 9/06* (2006.01)
*H04L 12/06* (2006.01)
*B60W 50/04* (2006.01)
*H04L 12/12* (2006.01)
*B60W 50/00* (2006.01)
*G05B 19/042* (2006.01)
*G06F 9/44* (2006.01)
*G06F 13/42* (2006.01)
*H04L 12/40* (2006.01)
*H04L 29/08* (2006.01)
*H04W 4/04* (2009.01)
*H04M 11/00* (2006.01)

(52) U.S. Cl.
CPC ........ *G06F 9/4401* (2013.01); *G06F 13/4265* (2013.01); *H04L 12/12* (2013.01); *H04L 12/40* (2013.01); *H04L 12/40039* (2013.01); *H04L 67/12* (2013.01); *H04W 4/046* (2013.01); *B60W 2050/0005* (2013.01); *B60W 2050/0016* (2013.01); *G06F 9/444* (2013.01); *H04L 2012/40215* (2013.01); *H04L 2012/40273* (2013.01); *H04M 11/007* (2013.01); *Y02B 60/1228* (2013.01); *Y02B 60/1235* (2013.01)

(58) Field of Classification Search
CPC ........... H04L 2012/40273; H04L 2012/40215; G06F 9/444; Y02B 60/34; Y02B 60/35
See application file for complete search history.

(56) References Cited

U.S. PATENT DOCUMENTS

| | | | |
|---|---|---|---|
| 9,260,066 B2* | 2/2016 | Tokunaga | B60R 16/03 |
| 2003/0098187 A1* | 5/2003 | Phillips | B60K 6/48 180/65.25 |
| 2003/0158635 A1 | 8/2003 | Pillar et al. | |
| 2006/0013237 A1 | 1/2006 | Furuta et al. | |
| 2010/0292808 A1 | 11/2010 | Berglund | |
| 2010/0312417 A1 | 12/2010 | Wakabayashi et al. | |
| 2012/0299556 A1 | 11/2012 | Ishikawa et al. | |
| 2016/0359545 A1* | 12/2016 | Kodama | H04L 12/407 |

OTHER PUBLICATIONS

International Preliminary Report on Patentability dated Feb. 8, 2016 issued in corresponding International patent application No. PCT/SE2015/050128.

* cited by examiner

INFRASTRUCTURE SYSTEM FOR A VEHICLE

CROSS-REFERENCE TO RELATED APPLICATIONS

The present application is a 35 U.S.C. §§371 national phase conversion of PCT/SE2015/050128, filed Feb. 5, 2015, which claims priority of Swedish Patent Application No. 1450179-5, filed Feb. 17, 2014, the contents of which are incorporated by reference herein. The PCT International Application was published in the English language.

TECHNICAL AREA

The present invention concerns an electrical infrastructure system for a motor vehicle for controlling several functional units for the vehicle, and concerns a method in such a system.

BACKGROUND TO THE INVENTION

In the more advanced vehicles available today, such as buses, lorries, trucks, work vehicles, and cars, a network, such as a CAN network (Controller Area Network), is used to handle the communication between various units (ECUs, electrical control units) in the vehicle. It is possible that also networks of Ethernet type may be used in the future.

A CAN network is a network in which all nodes (transmitters and receivers) are connected to the same line. This means that when a node transmits a message, all elements of the network can read it. It means also that only one message can be transmitted at a time, since there is only a single line that can be used. The communication over a CAN takes place according to a specified CAN protocol.

Often, a number of CAN networks that are connected through a central control unit are arranged.

The ECUs that are connected to the CAN handle a large number of functions for the vehicle. These are, for example, functions related to change of gear, steering, engine control, braking, climate-control systems, lighting, driver comfort, alarms and safety.

According to the currently available systems, an ECU functions as a unit that controls its own system, such as the instrument cluster that monitors, among other things, the instrument panel. The ECU is connected through its transceiver to the CAN bus, and the transceiver can be considered to function as a link between the bus and the ECU. The transceiver has hardware to transmit and receive data from the CAN. Some ECUs are connected to several buses. When the ECU is switched off, it will normally avoid all energy consumption. As soon as an ECU receives a wake-up signal, while it is switched off, it will activate its energy transducer and provide power for itself, its transceiver and, where relevant, other components.

The units that are connected to the CAN can be activated or "awakened" in several different ways. It may be by messages over the CAN or over separate signal lines.

WO-2009/054769 describes a network configuration for vehicles for the connection of a number of control units via a network. The control units contain state components that influence the control units to undergo a transition to an active or passive state, depending on the state mode that is prevalent for the vehicle.

The concept of "operational states" is currently used to be able to define in a simple manner which ECUs are awake in a certain state, and what is allowed in a particular state. The operational state of vehicles today is normally based on the position of the key and the status of the battery. ECUs are awakened and kept awake in the various states with the aid of various signals from various signal lines, which are activated by the key mechanism.

It is not certain that a key will be used in the future. For this reason, it is desirable to define operational states that are based on other grounds, such as a certain button press, or whether the presence of a driver has been detected.

Through the infrastructure system according to the invention, the key unit will not be retained, and this means that ECUs on the network, such as the CAN bus, will be awakened and kept awake in another way.

SUMMARY OF THE INVENTION

The purpose of the invention is to specify an improved infrastructure system for a vehicle that is safer and more general than currently available systems.

In particular, the purpose is to achieve an infrastructure system, and a method for this system, that do not depend on activation by a key or on the positions of the key.

The infrastructure system is configured to receive one or several input signals to at least one ECU. Those signals comprise parameter values that represent events. The term "events" is here used to denote, for example, that a person, e.g. an operator, is detected, that a regulator is influenced, that a temperature is exceeded or not reached, etc. The parameter values may relate to output signals from various sensors that are connected to ECUs or are connected in another manner to the network. The said, at least one, ECU is configured to analyze the said input signals with the aid of transition conditions, to determine an operational state for the vehicle based on the result of the analysis, and to make the operational state that has been determined available on the network.

According to the infrastructure system, each one of the ECUs comprises a state module that comprises a unique set of state rules for each one of the operational states. The state module is configured to identify the current operational state of the vehicle based solely on the state rules and to apply at the ECU the state rules that are associated with the operational state that has been identified, where the state rules comprise control parameters for the ECU.

Information about the current operational state of the vehicle is distributed on the CAN bus or CAN buses, and the ECUs themselves can thus determine whether they are to switch off.

In the event of a change of operational state, either relevant units, non-relevant units, or all units are awakened, depending on the awakening procedure that is used. Certain of the units subsequently switch themselves off when they receive information about which state is prevalent.

Several new operational states have been introduced into the state map since there is, or will be, a need for these states. Such a state has been defined for the situation in which the vehicle is driven autonomously.

In order for it to be possible for the system to change state, it must know which state is currently prevalent, and the necessary conditions for transition to another state must be satisfied.

To be more specific, change of state takes place through:
an ECU distributes the state on the CAN and is responsible for the change of state on the CAN. In this way all ECUs will be made aware of the current state.
all units that are awake can change state.
}

The solution according to the present invention is general and adapted to handle and incorporate new operational states, such as autonomous driving. The solution means also that dependence on a key disappears.

Thus, the ECUs that are connected to the CAN buses are aware of which state is prevalent on the network. This gives better opportunities than in current systems for the units to act in a smarter manner, depending on the state at the CAN bus. The instrument panel can, for example, be set with a less intense illumination in order to save energy when the network is not in a "drive"-state in which a driver is in the cabin and wants to see what is on the panel.

Other reasons to define new states are to make the units more intelligent, i.e. able to act differently depending on which state is prevalent, and this is a simple way of managing awakening and switching off.

Also, it will be easier to prevent certain events. The parking brake, for example, cannot be deactivated since it is not in an "active" state (on condition that the brake is automatically activated in the other states).

Furthermore, it is advantageous to have states with respect to the complete vehicle in order to connect different operational states of the vehicle in order to obtain a rapid overview of how the vehicle can be set in operation.

The only aspect that is affected by the current state, thus, is which units are to be awake. An operational state can be defined, for example, by the following factors:
- whether a driver or a passenger has been detected
- manual activation or deactivation through, for example, buttons or regulators
- remote control
- whether a diagnostic tool has been connected or disconnected
- the battery status and the position of a battery switch
- state priorities.

DETAILED DESCRIPTION OF PREFERRED EMBODIMENTS OF THE INVENTION

Figure 1:
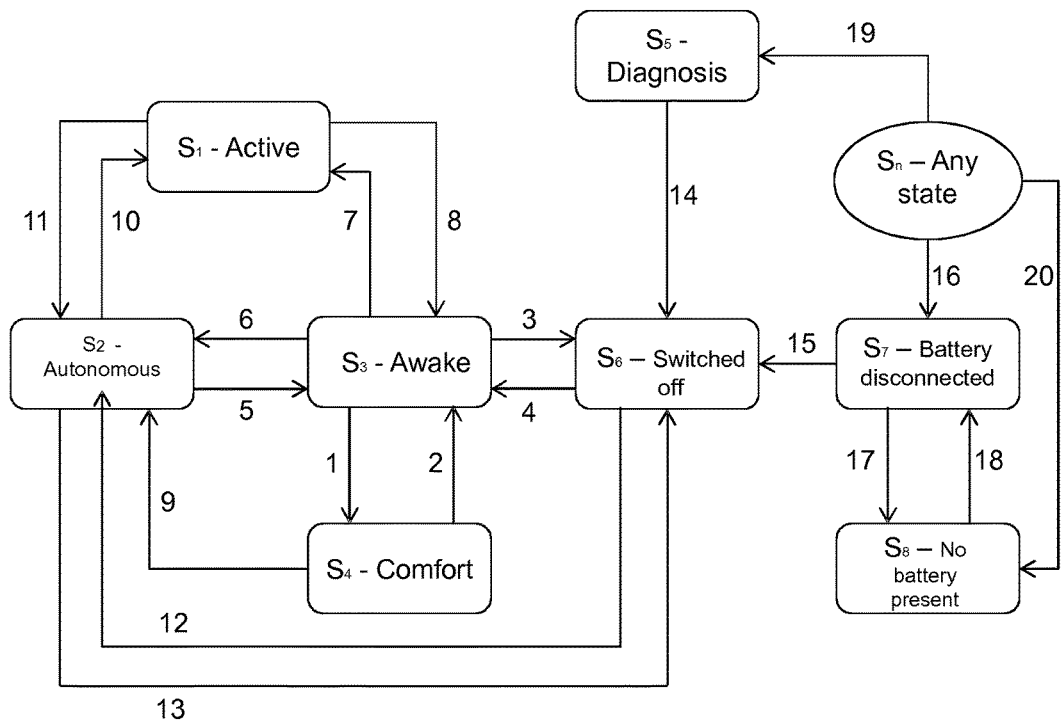
FIG. 1 shows an example of a state map that can be used during the implementation of the present invention.

The infrastructure system and the method of its use are described in detail below with reference to the attached drawings.

The same or similar parts have systematically been given the same reference numbers in the drawings.

A number of operational states S1-S8 and their transitions 1-20 will be described below with reference to the state map shown in FIG. 1. The states described are to be considered to be examples: it is possible not only that other states may be added, but also that one or several of the states that are described need not be included in a state map that is applied by the infrastructure system according to the invention. Each state has units that are awake and asleep, and some units can be both awake and switched off within the same state.

S1—Active

This state is intended for when the vehicle is used for manual driving or when it is working with something else.

The vehicle is in the "Active" state if the systems that support driving are active, and if neither one of the "Diagnostic" and "Autonomous" states is active. This state comprises in turn a number of sub-states.

Transitions to the "Active" state can take place from the "Awake" and the "Autonomous" states, as shown in FIG. 1.

7

The transition from "Awake" is activated manually, through, for example, a switch or button, or through the accelerator pedal being depressed.

10

The transition from "Autonomous" takes place when the "Autonomous" state is exited manually, through the driver deactivating the state manually, through, for example, a switch.

S2—Autonomous

This state is intended to be used possibly in the future when the vehicle is driven automatically or by remote control, in, for example, a traffic jam, or for vehicle platoons, e.g., a row of vehicles guiding on a lead vehicle, in order at the same time to be able to allow the driver of a vehicle to do other things. It will be possible in the future to implement this state for further situations.

This state is activated manually or by remote control. It is important to understand that this state itself comprises several states, such as when a passenger has been detected (the units related to comfort will in this case be activated) or an active state if the vehicle is being driven. The units that are active in this state will, therefore, change. As a result of this, the energy consumption varies, but it is always relatively high, since the units that are required to propel the vehicle are always active.

This state can be reached from the "Switched off", "Awake", "Active" and "Comfort" states, as will be described below.

12

The transition from the "Switched off" state takes place when autonomous driving is activated by a method.

6

The transition from the "Awake" state takes place when autonomous driving is activated by a method.

11

The transition from the "Active" state takes place when the driver manually activates the autonomous operational state.

9

The transition from the "Comfort" state takes place when autonomous driving is activated by a method.

S3—Awake

This state is used when the driver is close to or in the driver's cabin and components that are required to start the engine have not yet been activated. Most of the elements that contribute to making the driver comfortable, such as the radio, lighting and climate-control unit, are active in this state. This is a state also for the vehicle to prepare for the "Active" state, by, for example, warming up the engine or defrosting mirrors and windscreens. Most of the user-centered functions are available, with the exception of the driving functions. The transition to this state generally takes place when the driver is close to the vehicle and no other state is appropriate.

With reference to FIG. 1, the transitions to the "Awake" state will now be described. This state can be reached from the "Switched off", "Comfort", "Autonomous" and "Active" states.

4

The transition from "Switched off". This transition occurs when the driver is detected and the switch for the "Switched off" state is in the "OFF" condition.

2

The transition from "Comfort". This transition takes place when the "Comfort" switch is switched off.

5

The transition from "Autonomous". This transition depends on states that are internal to the "Autonomous" state, known as "sub-states". The transition occurs when a driver has been detected, and when the "Autonomous" state is not "Active" and the "Autonomous" state has been disengaged.

8

The transition from "Active". The transition takes place when the engine and the systems that are used for driving have been correctly switched off.

S4—Comfort

This state is primarily intended for the situation in which the driver or passenger requires to rest or sleep. It is manually engaged by the driver (transition 1) and it can be activated only from the "Awake" state (S3).

S5—Diagnostic

The purpose of the "Diagnostic" state is to provide a diagnostic service in a simple manner. This state is normally used by engineers and operational personnel. This state is activated from any one of the other states when a diagnostic tool is engaged and the wheels are not rotating (transition 19). The only exceptions are from the "Battery disconnected" and the "Battery not present" states.

S6—Switched Off

This state is the normal state when the vehicle is parked. It is used to minimize energy consumption in order to be able to be in operation for as long a period as possible. Some examples of units that need to be awake or that need to be occasionally awake are given below:

Alarm and locking functions (ALM) are always awake.

If the vehicle uses the system to detect a driver, detecting, for example, when the key is close to the vehicle, this system must be active.

Parking lights, if they were illuminated before the "Switched off" state.

The time-mileage recorder must be always active.

With reference to FIG. 1, the transitions to the "Switched off" state will now be described. This state can be reached from the "Battery disconnected", "Awake", "Autonomous" and "Diagnostic" states.

15

The transition from the "Battery disconnected" and occurs if a battery is connected and the battery switch is closed.

3

The transition from "Awake". This occurs when no driver is detected and no activity has taken place during a predetermined period. It is possible also for the driver to switch the "Awake" state off manually, and the vehicle in this case enters the "Switched off" state.

13

The transition from "Autonomous". This transition takes place when no passenger or driver has been detected and when the vehicle is either switched off by a remote-control unit or when it has completed its task.

14

The transition from "Diagnostic". As soon as anyone has carried out diagnosis of the system, the vehicle will always initially undergo a transition to the "Switched off" state. This takes place for reasons of safety.

S7—Battery Disconnected

It may be possible for some vehicles to disconnect the battery that supplies power to the units. Only those units that are directly connected to the battery are supplied with power in this state. The network enters this state when the battery has been disconnected. The state can be reached from any other state (transitions 16 and 18). The state is reached either when the battery has been put into position (transition 18) or when the battery has been connected and subsequently disconnected (transition 16). If the vehicle is not provided with a battery switch, this state may be replaced by the "Battery not present" state. The "Battery disconnected" operational state may be practical when the vehicle is to be parked for a long period.

S8—Battery not Present

The network enters this state when the battery that supplies power to the units is disconnected, and for this reason there is no power consumption. This state can be reached from any other state (transitions 17 and 20). No units are active in the state. From a technical point of view, the units will not know that they are in this state, since they are not supplied with power.

Also a state Sn is shown in FIG. 1. This state generally denotes transitions from all states.

Figure 2:
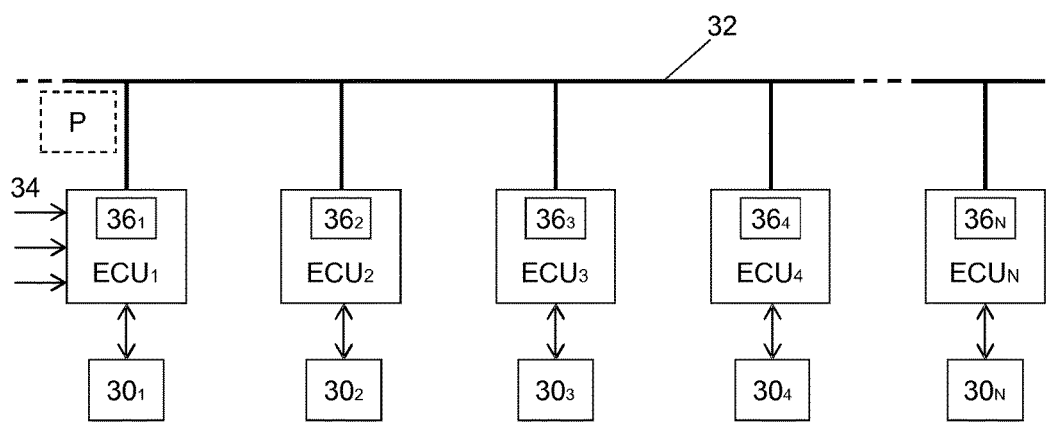
FIG. 2 is a block diagram that illustrates schematically an infrastructure system according to the present invention.

The infrastructure system according to the present invention will be described in detail below with reference to FIG. 2.

Thus, the patent concerns an electrical infrastructure system for a vehicle, comprising several electronic control units ECU1-ECUN for one or several functional units $30n$ for the vehicle, where the ECUs are connected through a network 32. The functional units concern units manage functions of the vehicle, such as functions related to change of gear, steering, engine control, braking, climate-control systems, lighting, driver comfort, alarms and safety. According to one embodiment, the network 32 is a CAN network, but it may be realized also as an Ethernet network. The system that is shown in FIG. 2 is to be regarded solely as an example. In normal applications, the network is often divided into a number of subnetworks with an ECU that connects the various subnetworks together. An ECU that functions in this way as a connecting ECU is often known as a "coordinating unit".

The infrastructure system is configured to implement a state map, for example of the type that is shown in FIG. 1, comprising several logical components in the form of various operational states Sn that the vehicle can adopt. These operational states are connected by one or several transitions Tn, which are denoted in FIG. 1 by the reference numbers 1-20, where the transition from one operational state to another depends on predetermined transition conditions being satisfied.

The infrastructure system is furthermore configured to receive one or several input signals 34 to at least one ECU, comprising parameter values that represent events. The term "events" is here used to denote, for example, that a person is detected, that a regulator is influenced, that a temperature is exceeded or not reached, etc. The parameter values may relate to output signals from various sensors that are connected to ECUs or in another manner to the network.

The said, at least one, ECU is configured to analyze the said input signals with the aid of the transition conditions, to determine an operational state Sn for the vehicle based on the result of the analysis, and to make the operational state that has been determined available on the network 32. The transition conditions are designed such that the transitions between the various operational states in the state map take place—according to, for example, the transitions that have been described above with reference to FIG. 1.

Each one of the ECUs comprises a state module 36 that comprises a unique set of state rules SnRm for each one of the operational states Sn. The state module 36 in the ECU is configured to identify the current operational state Sn of the vehicle based solely on the state rules, and to apply at the ECU the state rules SnRm that are associated with the operational state that has been identified, where the state rules comprise control parameters for the ECU. The state rules SnRm in the relevant ECU are adapted to determine whether the ECU is to be activated, depending on the operational state that has been identified.

Figure 3:
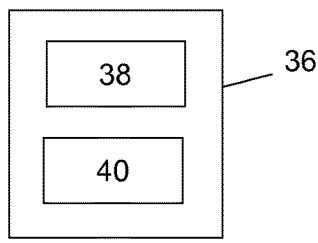
FIG. 3 shows a block diagram of a state module according to one embodiment of the invention.

FIG. 3 shows a schematic block diagram of a state module 36 that comprises a control unit 38 and a memory unit 40. The memory unit 40 is configured to store the state rules and the control parameters. The state rules may be structured, for example, as a table in which state rules that are associated with each operational state Sn are stored.

According to one embodiment, one of the ECUs is structured to function as a supervisory control unit for the network 32, configured to receive the input signal or input signals 34, and to determine the operational state of the vehicle.

In order to deal with situations in which conflicts occur with respect to which operational state is to be valid, it is preferable that the operational states have been given different priorities, from the lowest priority to the highest priority, and that an operational state with a higher priority is preferred to one with lower priority. The operational states given the highest priority are, for example, those that are most critical from the point of view of safety. This is achieved by allowing all of the states that can be reached from one state to have different priorities.

The present invention comprises also a method of use and operation an electrical infrastructure system for a vehicle. The infrastructure system is of the type that has been described above, and thus comprises several electronic control units (ECUs) for one or several functional units for the vehicle, where the said ECUs are connected through a network.

Figure 4:
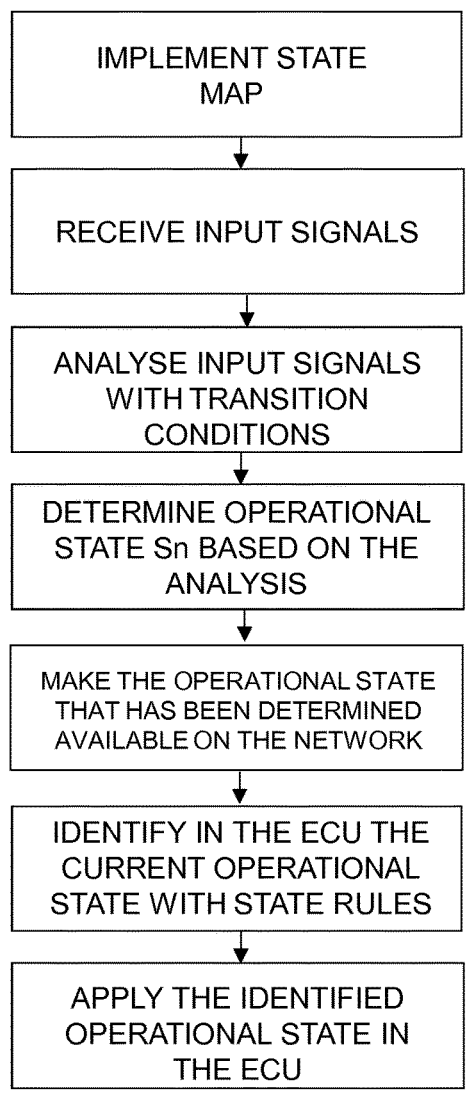
FIG. 4 is a flow diagram that illustrates the method according to the invention.

The method is described with reference to the flow diagram in FIG. 4.

The method comprises implementing a state map comprising several logical components in the form of various operational states Sn that the vehicle can selectively adopt. These operational states are connected with one or several transitions Tn that are denoted by reference numbers 1-20 in FIG. 1. Examples of operational states and various transitions have been described above.

The transition from one operational state to another depends on whether predetermined transition conditions are satisfied.

The method comprises the steps:
to receive, in at least one ECU, one or several input signals comprising parameter values that represent events. The term "events" is here used to denote, for example, that a person is detected, that a regulator is influenced, that a temperature is exceeded or not reached, etc.
to analyze the said input signals with the aid of the said transition conditions.
to determine an operational state Sn for the vehicle, based on the results of the analysis.
to make the operational state that has been determined available on the network.

The method further comprises to carry out, in a state module for each one of the ECUs and that comprises a unique set of state rules SnRm for each one of the operational states Sn, the steps:
to identify the current operational state Sn of the vehicle based solely on the state rules.
to apply at the ECU the state rules SnRm that are associated with the operational state that has been identified, where the said state rules comprise control parameters for the ECU.

The state rules SnRm in the relevant ECU are adapted to determine whether the ECU is to be activated, depending on the operational state that has been identified.

According to one embodiment, one of the said ECUs is structured to function as a supervisory control unit for the network, configured to receive the input signal or input signals, and to determine the operational state of the vehicle.

The state module comprises a control unit and a memory unit, and the memory unit is configured to store the state rules and control parameters.

In order to deal with situations in which conflicts occur with respect to which operational state is to be valid, it is preferable that the operational states have been given different priorities, from the lowest priority to the highest priority, and that an operational state with a higher priority is preferred to one with lower priority.

The invention comprises also a computer program comprising a program code P (see FIG. 2) in order to cause an infrastructure system 2, or a computer connected to the infrastructure system 2, to carry out the steps of the method that have been described above. It is preferable that the program code be distributed on one or several state modules 36.

The invention includes also a computer program product comprising the program code P stored on a medium that can be read by a computer in order to carry out the method steps described above. The computer program product may be, for example, a CD disc or, according to one embodiment, it may comprise a non-volatile memory NVM, such as a flash memory.

The present invention is not limited to the preferred embodiments described above. Various alternatives, modifications and equivalents can be used. The embodiments above are, therefore, not to be considered as limiting the protective scope of the invention, which is defined by the attached patent claims.

The invention claimed is:
1. An electrical infrastructure system for a vehicle, the vehicle having at least one functional unit for the vehicle, the system comprising:
a plurality of electronic control units (ECU) for one or several functional units for the vehicle, and a network connecting the ECUs;
the infrastructure system is configured to implement a state map comprising various operational states of the vehicle, one or several predetermined transition conditions connecting these operational states such that a transition from one operational state of the operational states to another operational state of the generated states depends on whether at least one predetermined transition condition of the predetermined transition conditions is satisfied;
the infrastructure system is configured to receive at least one input signal to at least one ECU, the input signal comprising a parameter value that represents an event, and the at least one ECU is configured to process the input signal, with the aid of the predetermined transi- tion conditions, to determine a current operational state of the operational states for the vehicle based on the result of the processing, and the at least one ECU is configured to make the current operational state that has been determined available on the network;

wherein the operational states for the vehicle have different priorities, from a lowest priority to a highest priority, and in case a conflict arises as to which operational state is to be determined as the current operational state, an operational state with a higher priority is preferred to one with a lower priority; and each of the ECUs comprises a state module that comprises a unique set of state rules for each one of the operational states, the state module is configured to identify the current operational state of the vehicle based solely on the state rules, and to apply at the ECU the state rules that are associated with the operational state that has been identified, wherein the state rules comprise control parameters for the ECU.

2. The infrastructure system according to claim 1, wherein one of the ECUs is structured to function as a supervisory control unit for the network and is configured to receive the input signal or the input signals, and to determine the operational state of the vehicle.

3. The infrastructure system according to claim 1, wherein each of the state modules comprises a control unit and a memory unit, wherein the memory unit is configured to store the state rules and the control parameters.

4. The infrastructure system according to claim 1, wherein the network is a CAN network.

5. The infrastructure system according to claim 1, wherein the network is an Ethernet network.

6. The infrastructure system according to claim 1, wherein the event comprises at least one of a person is detected, a regulator is influenced, and a temperature is exceeded or not reached.

7. The infrastructure system according to claim 1, wherein the state rules in selected ones of the ECUs are adapted and operative to determine whether the ECU is to be activated, depending on the operational state of the selected ECUs that has been identified.

8. A method of operation of an electrical infrastructure system for a vehicle, wherein the infrastructure system comprises several electronic control units ECUs for one or several functional units for the vehicle, the ECUs connected through a network implementing a state map comprising a plurality of operational states of the vehicle, wherein the operational states are connected by one or several predetermined transition conditions, such that a transition from one operational state to another operational state depends on whether a predetermined transition condition is satisfied, the method comprising:

receiving, in at least one of the ECUs, at least one input signal comprising a parameter value that represents an event;

automatically processing the input signal with the aid of the predetermined transition conditions for determining a current operational state for the vehicle, based on the results of the processing;

making the determined current operational state available on the network, wherein the operational states for the vehicle have different priorities, from lowest priority to highest priority, and in case a conflict arises as to which operational state is to be determined as the current operational state an operational state with a higher priority is preferred to one with a lower priority;

in a state module for each one of the ECUs wherein the state module comprises a unique set of state rules for each one of the operational states, performing the steps:
  identifying the current operational state of the vehicle based solely on the state rules; and
  applying at the ECU the state rules that are associated with the operational state that has been identified, wherein the state rules comprise control parameters for the ECU.

9. The method according to claim 8, wherein one of the ECUs is structured to function as a supervisory control unit for the network, is configured to receive the input signal or the input signals, and to determine the current operational state of the vehicle.

10. The method according to claim 8, wherein each of the state modules comprises a control unit and a memory unit,
  wherein the memory unit is configured to store the state rules and control parameters.

11. The method according to claim 8, wherein the network is a CAN network.

12. The method according to claim 8, wherein the network is an Ethernet network.

13. The method according to claim 8, wherein the events comprise a person is detected, a regulator is influenced, a temperature is exceeded or not reached.

14. The method according to claim 8, wherein the state rules in selected ones of the ECUs are adapted and operative to determine whether the ECU is to be activated, depending on the operational state of the selected ones of the ECUs that have been identified.

15. A computer program product comprising a non-transitory computer readable medium, and a computer program stored on the medium, wherein the computer program comprises a program code configured to cause an infrastructure system, or a computer connected to the infrastructure system, to carry out the steps of the method according to claim 8.

* * * * *